(12) United States Patent
Talegaonkar et al.

(10) Patent No.: US 12,573,140 B2
(45) Date of Patent: Mar. 10, 2026

(54) MACHINE LEARNING-BASED GENERATION OF THREE-DIMENSIONAL MODELS

(71) Applicant: QUALCOMM Incorporated, San Diego, CA (US)

(72) Inventors: Chinmay Talegaonkar, La Jolla, CA (US); Peng Liu, San Diego, CA (US); Lei Wang, San Diego, CA (US); Junkang Zhang, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 18/444,337

(22) Filed: Feb. 16, 2024

(65) Prior Publication Data

US 2025/0131647 A1 Apr. 24, 2025

Related U.S. Application Data

(60) Provisional application No. 63/591,969, filed on Oct. 20, 2023.

(51) Int. Cl.
| | |
|---|---|
| *G06T 17/00* | (2006.01) |
| *G06T 3/18* | (2024.01) |
| *G06T 7/73* | (2017.01) |

(52) U.S. Cl.
CPC ................ *G06T 17/00* (2013.01); *G06T 3/18* (2024.01); *G06T 7/75* (2017.01);
(Continued)

(58) Field of Classification Search
CPC .. G06T 17/00; G06T 3/18; G06T 7/73; G06T 7/75; G06T 2207/20081;
(Continued)

(56) References Cited

U.S. PATENT DOCUMENTS

| | | | |
|---|---|---|---|
| 2018/0350105 A1* | 12/2018 | Taylor | G06T 7/162 |
| 2024/0047225 A1* | 2/2024 | Wei | H01J 37/32926 |

(Continued)

FOREIGN PATENT DOCUMENTS

| | | | |
|---|---|---|---|
| CN | 114998514 A * | 9/2022 | G06V 20/46 |

OTHER PUBLICATIONS

Chen Y, Zheng Z, Li Z, Xu C, Liu Y. Meshavatar: Learning high-quality triangular human avatars from multi-view videos. InEuropean Conference on Computer Vision Sep. 2, 20249 (pp. 250-269). Cham: Springer Nature Switzerland.*

(Continued)

*Primary Examiner* — Phu K Nguyen
(74) *Attorney, Agent, or Firm* — Polsinelli LLP

(57) ABSTRACT

Systems and techniques are disclosed for generating a three-dimensional (3D) model. For example, a process can include estimating a plurality of features associated with at least a portion of images; inverse warping the plurality of features into reference pose features having a reference pose; generating filtered reference pose features by selecting features from the reference pose features based on a distance of the selected features from corresponding features from the reference pose; generating modified reference pose features by modifying the filtered reference pose features based on a feature grid associated with a reference model associated with the reference pose; projecting the filtered reference pose features into one or more two dimensional (2D) planes; identifying first features associated with the person from the one or more 2D planes; and generating a 3D model of the person having a pose using the first features, the modified reference pose features, and pose information.

20 Claims, 11 Drawing Sheets

600

(52) U.S. Cl.
CPC .............. *G06T 2207/10016* (2013.01); *G06T 2207/20081* (2013.01); *G06T 2207/20084* (2013.01); *G06T 2207/30196* (2013.01)

(58) Field of Classification Search
CPC . G06T 2207/30196; G06T 2207/10016; G06T 2207/20084
USPC ........................................................ 345/418
See application file for complete search history.

(56) References Cited

U.S. PATENT DOCUMENTS

| | | | |
|---|---|---|---|
| 2024/0303910 A1* | 9/2024 | Xiao | G06T 17/20 |
| 2024/0340398 A1* | 10/2024 | Varekamp | H04N 13/178 |
| 2024/0406363 A1* | 12/2024 | Varekamp | H04N 23/683 |
| 2025/0181056 A1* | 6/2025 | Urick | G05B 19/4093 |

OTHER PUBLICATIONS

Guo C, Li J, Kant Y, Sheikh Y, Saito S, Cao C. Vid2avatar-pro: Authentic avatar from videos in the wild via universal prior. InProceedings of the Computer Vision and Pattern Recognition Conference 2025 (pp. 5559-5570).*

Vuran O, Ho Hl. ReMu: Reconstructing Multi-layer 3D Clothed Human from Image Layers. arXiv preprint arXiv:2508.01381. Aug. 2, 2025.*

Chen X., et al., "VeRi3D: Generative Vertex-based Radiance Fields for 3D Controllable Human Image Synthesis", Arxiv.Org, Cornell University, 201 Olin Library Cornell University Ithaca, NY 14853, arXiv:2309.04800v1 [cs.CV], Sep. 9, 2023, 15 Pages, XP091609436, Abstract, Section 3, Figures 1 to 10.

International Search Report and Written Opinion—PCT/US2024/047225—ISA/EPO—Jan. 8, 2025.

Xu Z., et al., "Relightable and Animatable Neural Avatar from Sparse-View Video", Arxiv.Org, Cornell University Library, 201 Olin Library Cornell University Ithaca, NY 14853, arXiv:2308.07903v1 [cs.CV], Aug. 15, 2023, pp. 1-21, XP091595974, Abstract, Figures 1-5, Section 3.

* cited by examiner

202

FULLY CONNECTED

204

LOCALLY CONNECTED

210

212

214

216

206

CONVOLUTIONAL

208

300

Frames
310

Conversion System 320

Mutable 3D Model
330

800

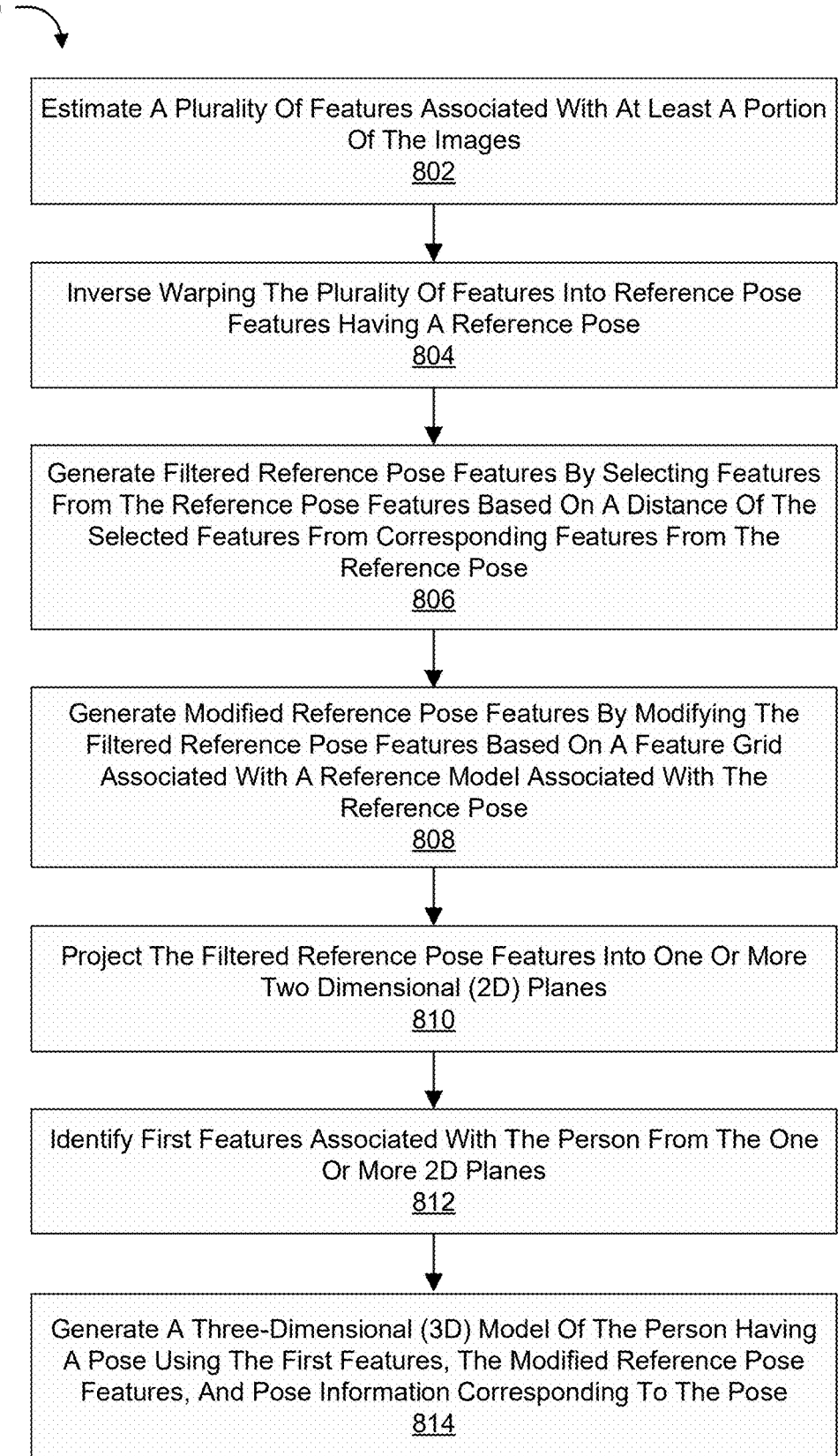

Estimate A Plurality Of Features Associated With At Least A Portion
Of The Images
802

Inverse Warping The Plurality Of Features Into Reference Pose
Features Having A Reference Pose
804

Generate Filtered Reference Pose Features By Selecting Features
From The Reference Pose Features Based On A Distance Of The
Selected Features From Corresponding Features From The
Reference Pose
806

Generate Modified Reference Pose Features By Modifying The
Filtered Reference Pose Features Based On A Feature Grid
Associated With A Reference Model Associated With The
Reference Pose
808

Project The Filtered Reference Pose Features Into One Or More
Two Dimensional (2D) Planes
810

Identify First Features Associated With The Person From The One
Or More 2D Planes
812

Generate A Three-Dimensional (3D) Model Of The Person Having
A Pose Using The First Features, The Modified Reference Pose
Features, And Pose Information Corresponding To The Pose
814

FIG. 8

MACHINE LEARNING-BASED GENERATION OF THREE-DIMENSIONAL MODELS

CROSS-REFERENCE TO RELATED APPLICATIONS

This application claims priority to U.S. Provisional Patent Application No. 63/591,969, filed Oct. 20, 2023, which is hereby incorporated by reference, in its entirety and for all purposes.

FIELD

The present disclosure generally relates to generating three-dimensional models. For example, aspects of the present disclosure relate to systems and techniques for generating three-dimensional (3D) models using a machine learning model (e.g., a deep neural network), such as based on monocular videos.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network can be implemented using computer technology inspired by logical reasoning performed by the biological neural networks in mammals. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

In some examples, systems and techniques are described for generating three-dimensional (3D) models using a machine learning model.

According to at least one example, a method includes: estimating a plurality of features associated with images of a person; inverse warping the plurality of features into reference pose features having a reference pose; generating filtered reference pose features by selecting features from the reference pose features based on a distance of the selected features from corresponding features from the reference pose; generating modified reference pose features by modifying the filtered reference pose features based on a feature grid associated with a reference model associated with the reference pose; projecting the filtered reference pose features into one or more two dimensional (2D) planes; identifying first features associated with the person from the one or more 2D planes; and generating a 3D model of the person having a pose using the first features, the modified reference pose features, and pose information corresponding to the pose.

In another example, an apparatus is provided that includes at least one memory and at least one processor coupled to the at least one memory and configured to: estimate a plurality of features associated with images of a person; inverse warp the plurality of features into reference pose features having a reference pose; generate filtered reference pose features by selecting features from the reference pose features based on a distance of the selected features from corresponding features from the reference pose; generate modified reference pose features by modifying the filtered reference pose features based on a feature grid associated with a reference model associated with the reference pose; project the filtered reference pose features into one or more 2D planes; identify first features associated with the person from the one or more 2D planes; and generate a 3D model of the person having a pose using the first features, the modified reference pose features, and pose information corresponding to the pose.

In another example, a non-transitory computer-readable medium is provided having stored thereon instructions that, when executed by at least one processor, cause the at least one processor to: estimate a plurality of features associated with images of a person; inverse warp the plurality of features into reference pose features having a reference pose; generate filtered reference pose features by selecting features from the reference pose features based on a distance of the selected features from corresponding features from the reference pose; generate modified reference pose features by modifying the filtered reference pose features based on a feature grid associated with a reference model associated with the reference pose; project the filtered reference pose features into one or more 2D planes; identify first features associated with the person from the one or more 2D planes; and generate a 3D model of the person having a pose using the first features, the modified reference pose features, and pose information corresponding to the pose.

In another example, an apparatus for processing one or more images is provided. The apparatus includes: means for estimating a plurality of features associated with images of a person; means for inverse warping the plurality of features into reference pose features having a reference pose; means for generating filtered reference pose features by selecting features from the reference pose features based on a distance of the selected features from corresponding features from the reference pose; means for generating modified reference pose features by modifying the filtered reference pose features based on a feature grid associated with a reference model associated with the reference pose; means for projecting the filtered reference pose features into one or more two dimensional (2D) planes; means for identifying first features associated with the person from the one or more 2D planes; and means for generating a 3D model of the person having a pose using the first features, the modified reference pose features, and pose information corresponding to the pose.

In some aspects, one or more the apparatuses or devices described herein is, is part of, and/or includes a wearable device, an extended reality (XR) device (e.g., a virtual reality (VR) device, an augmented reality (AR) device, or a mixed reality (MR) device, such as an XR head-mounted device (HMD) device or XR glasses), a wireless communication device such as a mobile device (e.g., a mobile telephone and/or mobile handset and/or so-called "smartphone" or another mobile device), a vehicle or a computing device or system of a vehicle, a camera, a personal computer, a laptop computer, a server computer, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers or gyroscopes, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIG. 8 is a flowchart an example process for generating a 3D model using a monocular video in accordance illustrating with aspects of the present disclosure;

DETAILED DESCRIPTION

Figure 1A:
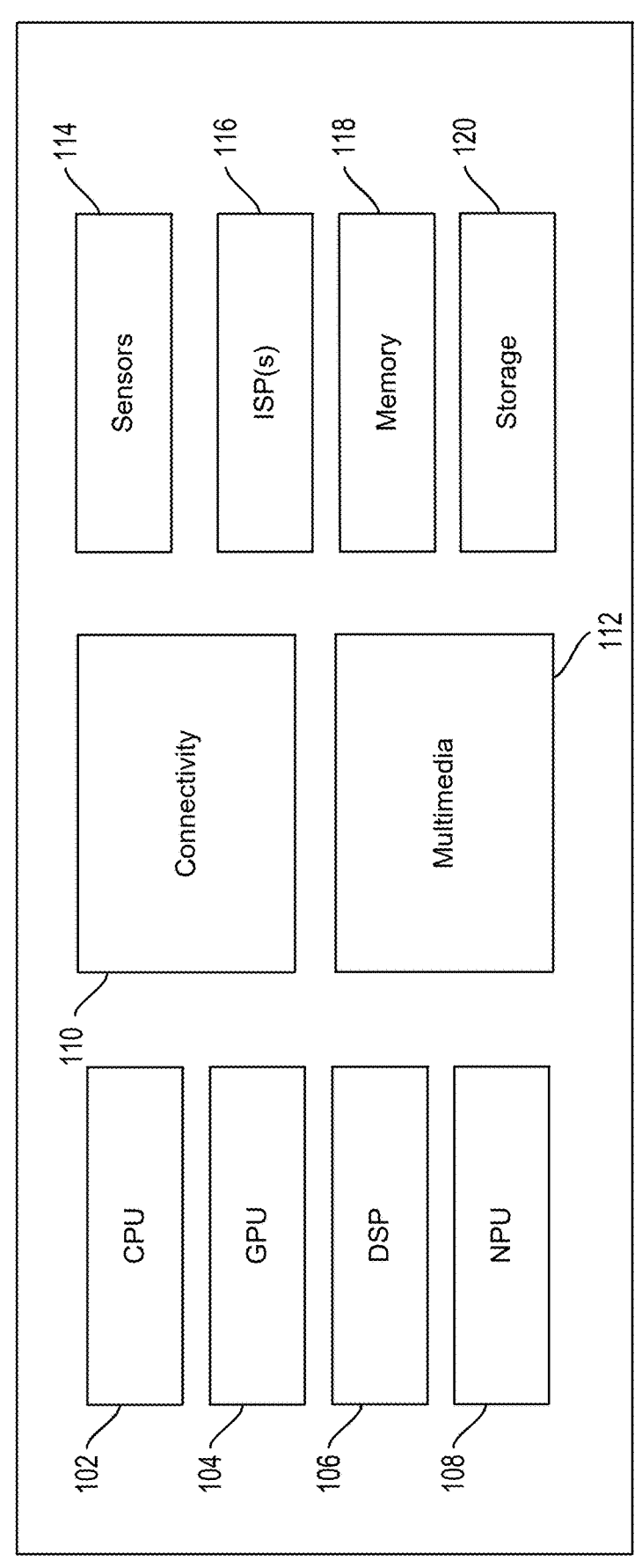
FIG. 1A illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides exemplary aspects and examples only, and is not intended to limit the scope, applicability, or configuration of the disclosure. Rather, the ensuing description of the exemplary aspects and examples will provide those skilled in the art with an enabling description for implementing aspects and examples of the disclosure. It should be understood that various changes may be made in the function and arrangement of elements without departing from the scope of the application as set forth in the appended claims.

As noted previously, various devices and systems allow a scene to be captured by generating images (or frames) and/or video data (including multiple frames) of the scene. A camera is a device that receives light from a scene and captures images, such as still images or video frames, using an image sensor. The terms "image," "image frame," and "frame" are used interchangeably herein. Cameras may include processors, such as image signal processors (ISPs), that can receive one or more images and process the one or more images. For example, a raw image frame captured by a camera sensor can be processed by an ISP to generate a final image. Processing by the ISP can be performed by a plurality of filters or processing blocks being applied to the captured image, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Machine learning systems (e.g., deep neural network systems or models) can be used to perform a variety of tasks such as, for example and without limitation, video encoding (or compression) and/or video decoding (or decompression), detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. For instance, various ISP operations (e.g., ISP processing blocks, including one or more of the processing blocks described above) can be implemented using one or more machine learning networks. An image processing machine network can be included in the ISP and/or can be separate from the ISP. Moreover, machine learning models can be versatile and can achieve high quality results in a variety of tasks. In some cases, an image processing machine learning network can be trained and/or implemented based on a use case associated with the input image data and/or output image data of the image processing machine learning network.

Image data (e.g., images, image frames, frames, etc., obtained using a camera) can be used for various purposes. In some examples, image data can be provided as input to a decision-making algorithm associated with surveillance, detection, and/or maneuvering, etc. For instance, a camera feed (e.g., image data) can be provided as input to an autonomous or semi-autonomous vehicle control system. The image data may in some cases be provided in combination with various other sensor inputs associated with or corresponding to the image data (e.g., sensor inputs captured at a same or similar time as the images, in a same or similar location or environment as the images, etc.). For example, image data can be used to perform tasks such as road-boundary detection, sign-board detection, pathway detection, autonomous or semi-autonomous maneuvering, surveillance monitoring, etc.

An avatar is a representation (e.g., a three-dimensional (3D) model) of a person in different mediums. Avatars have versatile applications. For example, avatars can serve as a digital representation of a person that bridges the virtual and physical worlds. Avatars have a variety of uses such as gaming, virtual education, seminars, and virtual meetings. For example, custom avatars in online gaming or collaboration allow players to immerse themselves in different personas, enhance the gaming experience, and foster a sense of identity and community within multiplayer environments. In virtual education and training, custom avatars provide realistic simulations, enabling learners to practice real-world scenarios and skills in a safe, immersive setting. In the context of social media and virtual worlds, custom avatars provide personal expression and increase the user experience. Custom avatars are increasingly employed in teleconferencing and remote work and help individuals maintain a professional appearance and increase the quality of communication or collaboration with other participants.

A skinned multi-person linear (SMPL) mesh model is a highly versatile 3D model used in computer graphics, computer vision, and the gaming industry. SMPL models are simple and efficient in representing human body shapes and movements. SMPL models are created through a combination of linear shape blending and pose-dependent deformations, which allows for realistic articulation and animation of the human body. These models are widely adopted for applications such as virtual reality, augmented reality, and clothing simulations, where accurate and natural-looking human representations are essential.

Another type of mesh model is a neural radiance fields (NeRF) mesh model that combines neural networks and 3D modeling to create highly detailed and realistic 3D representations of human subjects. NeRF models capture both geometry and appearance data, allowing for the creation of immersive and lifelike digital human avatars or reconstructions. These models employ neural networks to infer volumetric scene representations from multiple two-dimensional (2D) images, providing a dynamic and data-driven way to generate detailed 3D models of individuals. A NeRF model learns a five-dimensional (5D) radiance field of a scene from multi-view camera inputs. The radiance field is approximated as a multilabel perceptron (MLP) with an implicit representation that uses an input 3D position (x, y, z) of a point and viewing direction $d=(\theta, \varphi)$ and outputs a color and density $(c, \sigma)$ for the 3D point.

Training a human mesh model, such as a NeRF model or an SMPL model, is a challenging and resource-intensive task. The difficulties are based on the complexity of human anatomy and the intricate details that are needed to model important details. Training human mesh models requires vast amounts of training data, making data collection and annotation labor-intensive. Moreover, the computational demands during the training process are substantial. The generation of high-resolution, multi-view images and their corresponding 3D representations necessitates enormous processing power and extensive memory bandwidth. The high-resolution images and intricate 3D structures of human subjects, especially when aiming for realistic levels of detail, can lead to extensive training times, often taking days or even weeks to converge. This process places a heavy burden on advanced graphical processing units (GPUs) and specialized hardware, limiting accessibility to organizations with significant computational resources.

Systems, apparatuses, processes (also referred to as methods), and computer-readable media (collectively referred to as "systems and techniques") are described herein that provide a machine learning-based video processing system (e.g., using one or more neural network models). In some aspects, the systems and techniques can obtain images of a subject (e.g., a person) and estimate a plurality of features associated with the images. For example, the systems and techniques can include a pose refinement engine for identifying features (e.g., a skeletal bone estimation of a person, a surface estimation of the person, etc.) and inverse warping the plurality of features into reference pose features having a reference pose. For example, images of a person can be converted into a 3D geometric representation (e.g., point cloud, voxels, etc.) and warped into a reference pose. A non-limiting example of a reference pose is a T-pose and comprises a person with biased arms extending laterally at shoulder height.

The 3D representation of the person in the reference pose is provided to a general feature extraction engine and a unique feature extraction engine. In some aspects, the general features associated with the person in the images are interpolated and mapped to a reference model, which is a trained 3D model that represents generic features of a person. The reference model is modified based on interpolating an irregular feature grid (e.g., a vertex of the reference model) and a plurality of points associated with the 3D representation of the person in the reference pose. The unique features are extracted using a triplane based on projection in 3D space into planes in 2D. In some aspects, the unique features and the general features are combined (e.g., concatenated) to generate a mutable 3D model. In some cases, pose information can be provided a MLP to generate a 3D model associated with the person and oriented based on the pose information.

The disclosed systems and techniques reduce memory requirements by filtering points and reducing unnecessary data. The disclosed systems and techniques also use limited resources can be employed on hardware devices with limited memory and compute budget to train a machine learning (ML) model that is unique to and corresponds to the person in the obtained images.

Additional aspects of the present disclosure are described in more detail below.

FIG. 1A illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor, image signal processors (ISPs) 116, and/or storage 120.

The SOC 100 may be based on an ARM instruction set. In an aspect of the present disclosure, the instructions loaded into the CPU 102 may include code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may include code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform depth completion according to aspects of the present disclosure.

SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, one or more sensors 114, the sensor processor, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Figure 1B:
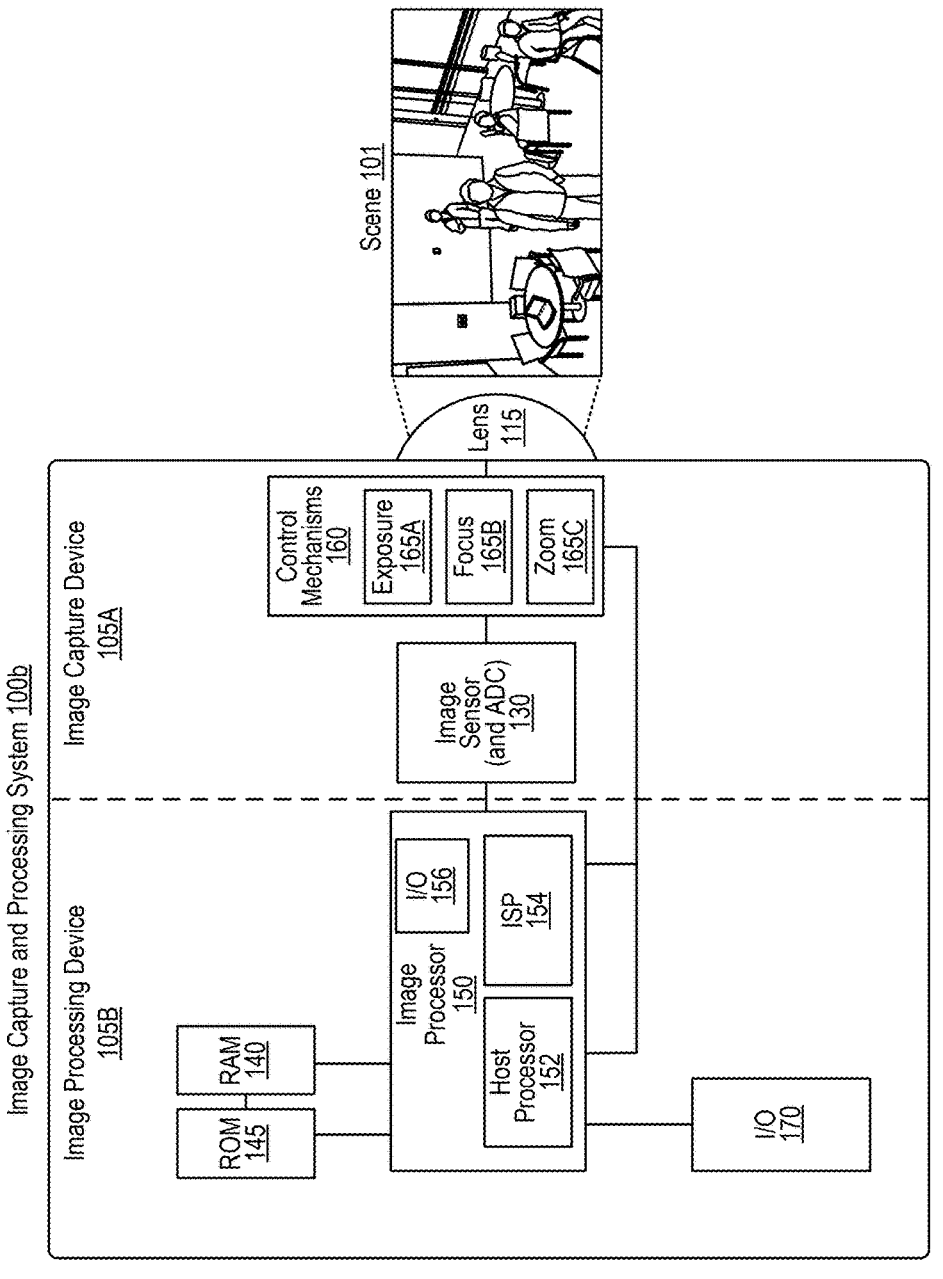
FIG. 1B is a block diagram illustrating an example architecture of an image capture and processing system, in accordance with some examples.

FIG. 1B is a block diagram illustrating an architecture of an image capture and processing system 100*b*. The image capture and processing system 100*b* includes various components that are used to capture and process images of scenes (e.g., an image of a scene 101). The image capture and processing system 100*b* can capture standalone images (or photographs) and/or can capture videos that include multiple images (or video frames) in a particular sequence. A lens 115 of the system 100*b* faces a scene 101 and receives light from the scene 101. The lens 115 bends the light toward the image sensor 130. The light received by the lens 115 passes through an aperture controlled by one or more control mechanisms 160 and is received by an image sensor 130.

The one or more control mechanisms 160 may control exposure, focus, and/or zoom based on information from the image sensor 130 and/or based on information from the image processor 150. The one or more control mechanisms 160 may include multiple mechanisms and components; for instance, the control mechanisms 160 may include one or more exposure control mechanisms 165A, one or more focus control mechanisms 165B, and/or one or more zoom control mechanisms 165C. The one or more control mechanisms 160 may also include additional control mechanisms besides those that are illustrated, such as control mechanisms controlling analog gain, flash, HDR, depth of field, and/or other image capture properties.

The focus control mechanism 165B of the control mechanisms 160 can obtain a focus setting. In some examples, focus control mechanism 165B store the focus setting in a memory register. Based on the focus setting, the focus control mechanism 165B can adjust the position of the lens 115 relative to the position of the image sensor 130. For example, based on the focus setting, the focus control mechanism 165B can move the lens 115 closer to the image sensor 130 or farther from the image sensor 130 by actuating a motor or servo, thereby adjusting focus. In some cases, additional lenses may be included in the system 100*b*, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 160, the image sensor 130, and/or the image processor 150. The focus setting may be referred to as an image capture setting and/or an image processing setting.

The exposure control mechanism 165A of the control mechanisms 160 can obtain an exposure setting. In some cases, the exposure control mechanism 165A stores the exposure setting in a memory register. Based on this exposure setting, the exposure control mechanism 165A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 165C of the control mechanisms 160 can obtain a zoom setting. In some examples, the zoom control mechanism 165C stores the zoom setting in a memory register. Based on the zoom setting, the zoom control mechanism 165C can control a focal length of an assembly of lens elements (lens assembly) that includes the lens 115 and one or more additional lenses. For example, the zoom control mechanism 165C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 101 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 165C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 160 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1110 discussed with respect to the computing system 1100. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image downsampling, pixel interpolation, automatic exposure (AE) control, automatic gain control (AGC), CDAF, PDAF, automatic white balance, merging of images to form an HDR image, image recognition, object recognition, feature recognition, receipt of inputs, managing outputs, managing memory, or some combination thereof. The image processor 150 may store images and/or processed images in random access memory (RAM) 1125, read-only memory (ROM) 1120, a cache 1112, a memory unit (e.g., system memory 1115), another storage device 1130, or some combination thereof.

Various input/output (I/O) devices 170 may be connected to the image processor 150. The I/O devices 170 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 170, or through a virtual keyboard or keypad of a touchscreen of the I/O devices 170. The I/O 156 may include one or more ports, jacks, or other connectors that enable a wired connection between the system 100b and one or more peripheral devices, over which the system 100b may receive data from the one or more peripheral device and/or transmit data to the one or more peripheral devices. The I/O 156 may include one or more wireless transceivers that enable a wireless connection between the system 100b and one or more peripheral devices, over which the system 100b may receive data from the one or more peripheral device and/or transmit data to the one or more peripheral devices. The peripheral devices may include any of the previously-discussed types of I/O devices 170 and may themselves be considered I/O devices 170 once they are coupled to the ports, jacks, wireless transceivers, or other wired and/or wireless connectors.

In some cases, the image capture and processing system 100b may be a single device. In some cases, the image capture and processing system 100b may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1B, a vertical dashed line divides the image capture and processing system 100b of FIG. 1B into two portions that represent the image capture device 105A and the image processing device 105B, respectively. The image capture device 105A includes the lens 115, control mechanisms 160, and the image sensor 130. The image processing device 105B includes the image processor 150 (including the ISP 154 and the host processor 152), the RAM 140, the ROM 145, and the I/O 156. In some cases, certain components illustrated in the image capture device 105A, such as the ISP 154 and/or the host processor 152, may be included in the image capture device 105A.

The image capture and processing system 100b can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100b can include one or more wireless transceivers for wireless communications, such as cellular network communications, 802.11 Wi-Fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100b is shown to include certain components, one of ordinary skill will appreciate that the image capture and processing system 100b can include more components than those shown in FIG. 1B. The components of the image capture and processing system 100b can include software, hardware, or one or more combinations of software and hardware. For example, in some implementations, the components of the image capture and processing system 100b can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100b.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past images. The host processor 152 can also dynamically configure the parameter settings of the internal pipelines or modules of the ISP 154 to match the settings of one or more input images from the image sensor 130 so that the image data is correctly processed by the ISP 154. Processing (or pipeline) blocks or modules of the ISP 154 can include modules for lens (or sensor) noise correction, de-mosaicing, color conversion, correction or enhancement/suppression of image attributes, denoising filters, sharpening filters, among others. Each module of the ISP 154 may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

ML can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
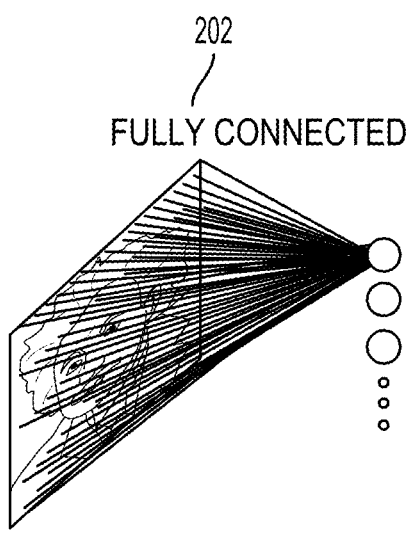
FIG. 2A illustrates an example of a fully connected neural network, in accordance with some examples.
Figure 2B:
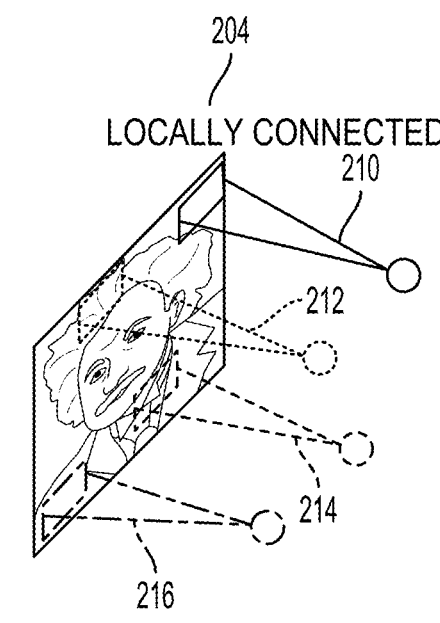
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
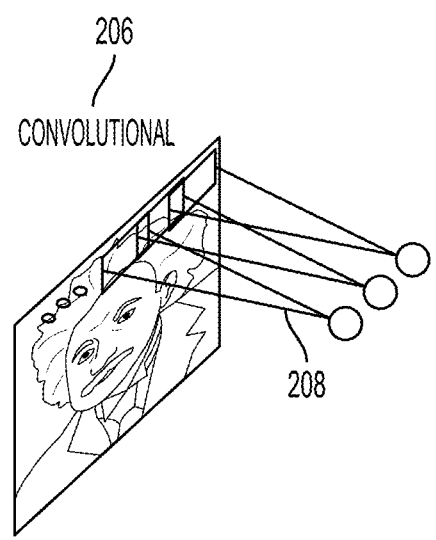
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of image processing, according to aspects of the present disclosure. An illustrative example of a deep learning network is described in greater depth with respect to the example block diagram of FIG. 10. An illustrative example of a convolutional neural network is described in greater depth with respect to the example block diagram of FIG. 11.

Deep convolutional networks (DCNs) are networks of convolutional networks, configured with additional pooling and normalization layers. DCNs can achieve high performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less than, for example, that of a similarly sized neural network that includes recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
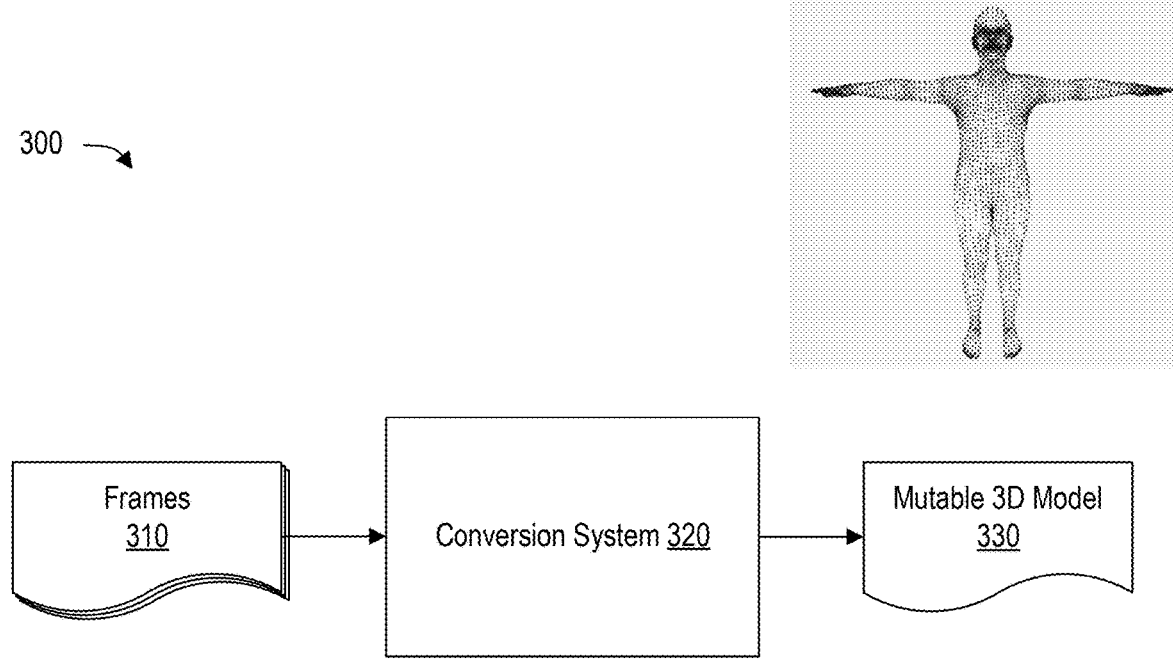
FIG. 3 is a conceptual diagram illustrating a 3D model generation process in accordance with some aspects of the disclosure.

FIG. 3 is a conceptual diagram illustrating a 3D model generation process 300 in accordance with some aspects of the disclosure. As illustrated in FIG. 3, a plurality of frames 310 (e.g., images) are fed into a conversion system 320. In some aspects, the plurality of frames 310 include frames (or images) that are captured by a single image sensor (e.g., a monocular imaging system). For example, an imaging system, such as a mobile phone, can capture the frames 310.

The conversion system 320 is configured to perform various processes to modify the frames 310 and generate a mutable 3D model 330. In some aspects, the conversion system 320 includes various aspects that are configured to process at least a portion of the frames 310 and convert the frames into a 3D representation. In one illustrative example, the conversion system 320 can include a plurality of machine learning models to perform different functions. For example, the conversion system 320 may include a first machine learning model to estimate a bone position of a subject (e.g., a person) in the plurality of frames. The conversion system 320 may also include a second machine learning model to generate a 3D volumetric structure associated with the subject. In one non-limiting example, the second machine learning model is configured to generate a 3D point cloud, with each point in the cloud representing at least three dimensions (e.g., three positions in a 3D cartesian or other coordinate system). In some cases, the second machine learning model can represent more than three dimensions (e.g., a color and a density). Points in the 3D point cloud may be represented by a tensor, which is an encoded version of a feature. A tensor is a mathematical object that represents and manipulates multi-dimensional data. In some cases, a tensor is a generalization of scalars, vectors, and matrices into higher dimensions, where each element is identified by a set of indices. Tensors can have any number of dimensions and provide a flexible framework for organizing and performing operations on data.

In some aspects, the conversion system 320 is configured to mutate the 3D volumetric structure into a canonical pose. A canonical pose is a standardized or reference position or orientation that describes the state or appearance of an object or entity. This canonical pose is standardized to simplify analysis, comparisons, and computations, allowing for consistent representations of the human anatomy despite variations in their initial positions or orientations. For example, the canonical pose may be a T-pose, which is further illustrated in FIG. 5.

A human body is a sparse volume as compared to joint mobility and positioning opportunities of the human body within a 3D boundary. In some aspects, by morphing the 3D volumetric structure into a canonical pose, the conversion system 320 can remove points within the 3D space based on proximity to the 3D volumetric structure. Removing points based on the canonical pose reduces the number of points in the 3D volumetric structure (in the canonical pose). For example, removing points that are within a threshold distance (e.g., 10 cm) from the canonical pose can reduce memory consumption of the 3D volumetric structure by 40%. The reduction in points also decreases convergence time of the training process.

The conversion system 320 may be configured to fine-tune a 3D model based on a generalized 3D model. In some aspects, the conversion system 320 may train a generalized 3D model using different models (e.g., different subjects). For example, the generalized 3D model comprises a fixed number of 3D points (e.g., 6,890 tensors) representing generalizable features of a human anatomy. In one aspect, an SMPL model is a linear model (e.g., the model is differentiable) and receives a pose vector $S \in R^{72 \times 1}$ (e.g., axis angle rotations with respect to each of the 24 human joints), and a shape parameter vector $\beta \in R^{10 \times 1}$, and outputs a mesh with 6890 vertices of the human subject in the specified pose.

Figure 4:
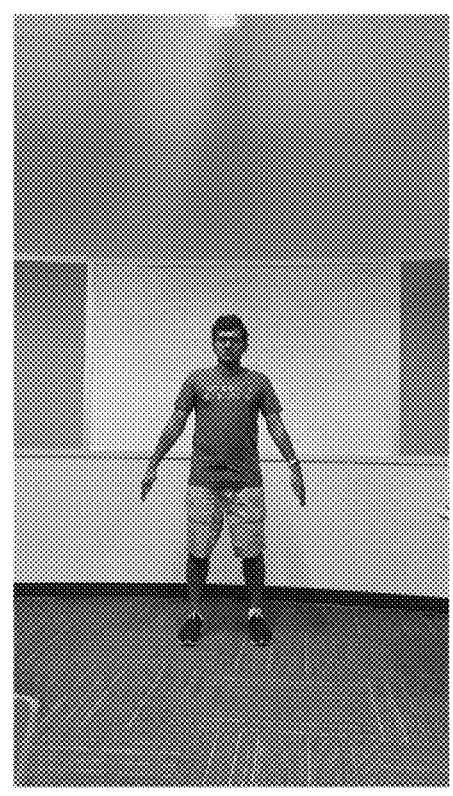
FIG. 4 is an image of a monocular video that can be provided to a 3D modeling system for generating a mutable 3D model in accordance with some aspects of the disclosure.

FIG. 4 is an image or frame of a monocular video that can be provided to a 3D modeling system for generating a mutable 3D model in accordance with some aspects of the disclosure. For example, the images can be captured using a single camera (e.g., using an image capturing device of a cell phone or other electronic device having an image sensor and corresponding image capture capabilities). In this example, the subject of the video (e.g., the person) rotates at least 1800 in the video to capture at least images corresponding to a front surface of the subject, a side surface of the subject, and a back surface of the subject.

Figure 5:
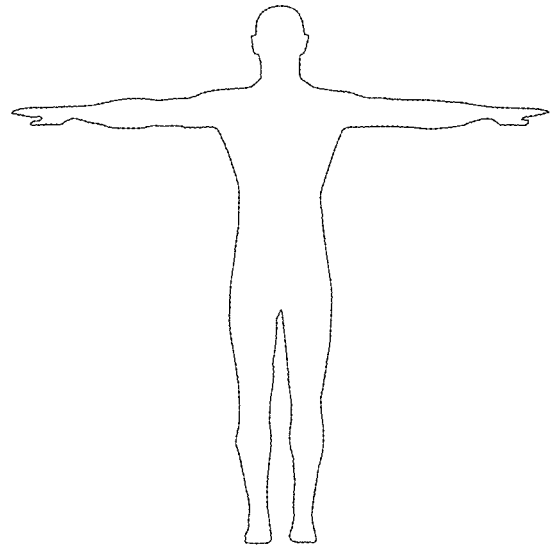
FIG. 5 is an illustration of a canonical pose used in a 3D modeling system in accordance with some aspects of the disclosure.

FIG. 5 is an illustration of a canonical pose used in a 3D modeling system in accordance with some aspects of the disclosure. In some aspects, the T-pose comprises a shoulder-biased position with arms fully extended for modeling a full 3D environment. The T-pose is one example, but other poses may be deemed canonical. Non-limiting examples of other poses include a neutral stand pose, an overhead extended pose, a sitting pose, a kneeling pose, and so forth.

Figure 6:
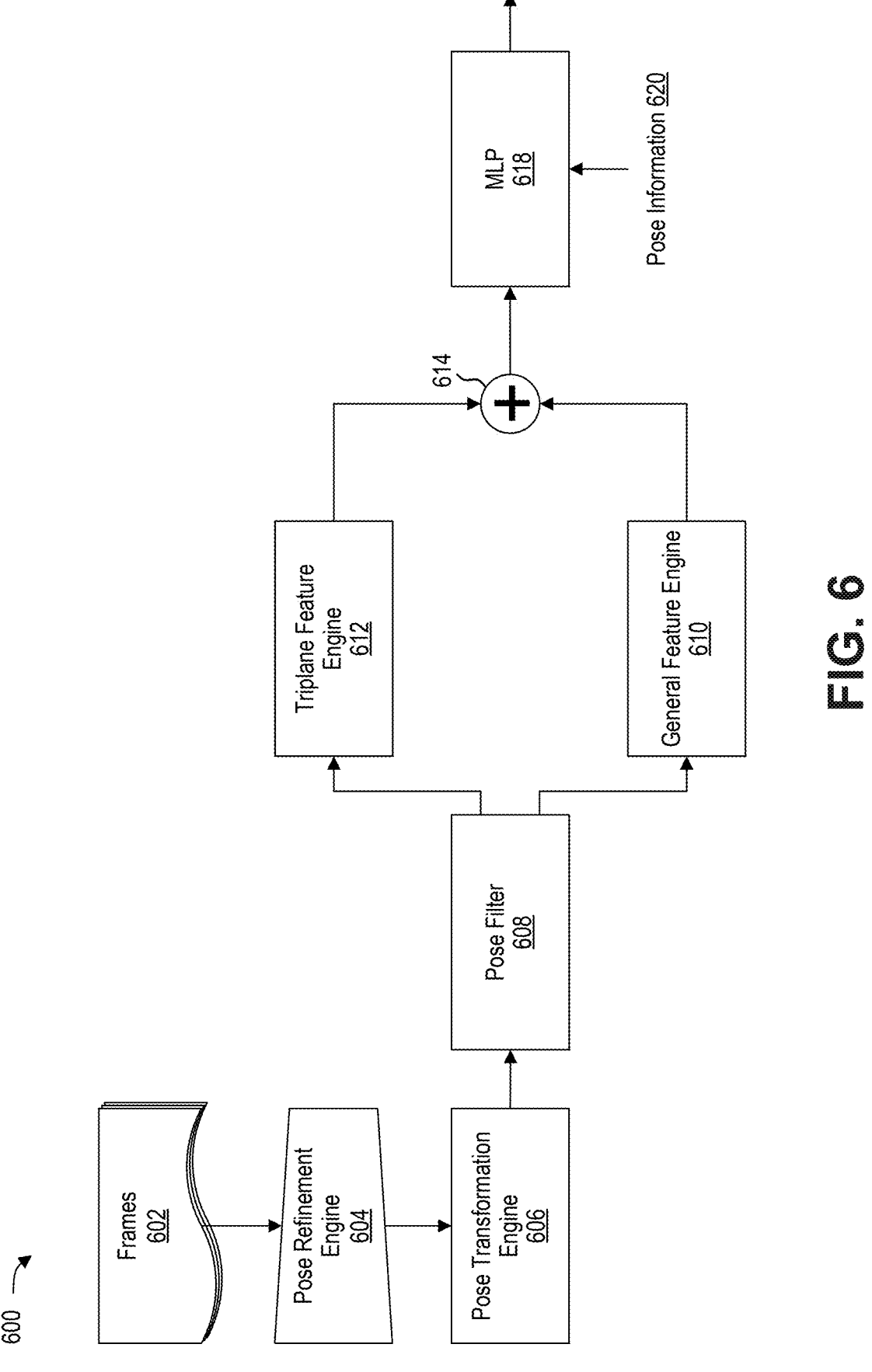
FIG. 6 is a conceptual diagram of a 3D model generation system in accordance with some aspects of the disclosure.

FIG. 6 is a conceptual diagram of a 3D model generation system 600 in accordance with some aspects of the disclosure. In some aspects, the 3D model generation system 600 receives frames 602 for conversion into a human mesh model. For example, the 3D model generation system 600 may receive frames of a person standing and rotating in an A-pose as illustrated in FIG. 4. The 3D model generation system 600 may process each frame as described herein, or may select frames based on various distinguishing features. For example, the 3D model generation system 600 may select every frame, every even (or odd) frame, or select frames based on an optical flow (e.g., the amount of movement between frame to frame).

The selected frames are provided to a pose refinement engine 604, which generates an estimated 3D frame. For example, the estimated 3D frame may be a point cloud, voxels, or other representations of the subject of the frames 602 in a 3D coordinate space. In some aspects, the pose refinement engine 604 may include a first ML model that is configured to estimate the skeletal positioning of the subject of the frames 602 and a second ML model configured to estimate a volume associated with the surface of the subject of the frames 602. The pose refinement engine 604 may also include a pose refinement ML model that corrects positioning of the skeletal bones and surfaces of the subject.

The pose refinement engine 604 provides the estimated frame to a pose transformation engine 606. The pose transformation engine 606 is configured to inverse warp the estimated 3D frame into a canonical frame (e.g., the T-pose). For example, the pose refinement engine 604 may include a trained machine learning model for receiving an estimate of a person's 3D representation and mutating the estimated 3D frame into a canonical pose frame. In one example, the pose refinement engine 604 may be an MLP network that receives the estimated frame in pose P having joints J deformed by positioning Q. The inverse warping is described by Equation 1 below:

$$x_c = \sum_{i=1}^{24} w_i'(x)\left(R_i^{inv}x + T_i^{inv}\right) \qquad \text{(Eq. 1)}$$

In this case, there are 24 skeletal bones to model, and w' denotes the inverse blend weights that are optimized during training. The inverse blend weights may be initialized during a Gaussian bone deformation. The inverse blend weights w' may be stored in a voxel $W_c$ of size 32×32×32×25, with 25 voxels being required for 24 skeletal bones and one additional background). The voxel $W_c$ is a learnable voxel having the same size as $W_{prior}$ and is described by Equation 2 below.

$$W_c = W_{prior} + \Delta W \qquad \text{(Eq. 2)}$$

In this case, any given point can be queried using a trilinear interpolation using the inverse blend weights w'. In this case, modeling $W_{prior}$ as a voxel is efficient as opposed to a 3D convolution network used in previous approaches (e.g., NeRF).

The pose transformation engine 606 uses the estimated 3D frame from the pose refinement engine 604 and creates a canonical pose frame of the subject based inverse warping as described above. In one illustrated example, the canonical pose model comprises a set of SMPL vertices $V_c \in R^{6890 \times 3}$ in the canonical pose and maintains c dimensional general features anchored to each SMPL vertex, which are denoted as $G_v \in R^{6890 \times c}$. For any 3D point in the human canonical coordinate frame p=(x, y, z), the pose transformation engine 606 can extract the general features $e^g$ corresponding to the K nearest neighbors of point p in the SMPL vertices $V_c$.

The pose transformation engine 606 provides the canonical pose frame to a pose filter 608 for refinement prior to feature extraction. As described above, the human model is sparse in space, particularly in the T-pose, and data from the canonical pose frame can be removed that is not proximate to the T-pose. The pose filter 608 is configured to filter points that are too far from the 3D model of the human body to reduce the memory consumption and processing required. For example, querying an MLP for all points on all rays is wasteful the performance of the MLP can be improved by selecting ray points close to the human mesh. In one aspect, the pose filter 608 filters points that are within E distance of the SMPL vertices. For example, E may be 10 cm. In one example, E may be 10 cm and reduces training memory by almost 40% while removing points too far from the canonical pose frame. In the case of an SMPL mesh, removing the points reduces the number of queries that are performed by the general feature point cloud, triplane model, and a radiance MLP. In one illustrative example, the pose filter 608 may be a K-nearest neighbor (KNN) that queries the human canonical coordinate frame.

The filtered canonical pose frame is provided to a general feature engine 610 and a triplane feature engine 612. The general feature engine 610 is configured to extract general features $e^g$ corresponding to the K nearest neighbors of a feature grid (e.g., a point cloud) of a point p in SMPL vertices $V_c$. In some aspects, the general feature engine 610 is configured to use a feature grid associated with a generalized model, which is pretrained from other models, to select the general features $e^g$. For example, the generalized model comprises 6,890 points and K points corresponding to the nearest neighbor of the feature grid are selected. The selected feature vector is provided to one layer of an MLP to obtain a final feature. Naively interpolating the features for an arbitrary point for an irregular feature grid can produce incorrect features. In some aspects, each point selected point is augmented with a positional encoding (e.g., L=10), which provides a negligible increase to the size of MLPG, but also provides a significant improvement in extracted feature quality. Equations 3-5 below describe an example algorithm for querying features for a point P from a general feature point cloud:

$$e^g(p) = \frac{\sum_{i=1}^{K} w_i(p) G_v[i]}{\sum_{i=1}^{K} w_i(p)} \qquad \text{(Eq. 3)}$$

$$w_i(p) = \exp\left(-\beta \|p - V_C[i]\|^2\right) \qquad \text{(Eq. 4)}$$

$$e^g(p) = MLP_G([e^g(p), \gamma(p)]) \qquad \text{(Eq. 5)}$$

For each inverse blend weight $w_i$, $\beta$ controls the smoothness of the weighting function. This approach allows fast querying of general features for any point p in the canonical coordinate system. The general feature engine 610 outputs a general feature point cloud that mutates generalized features based on the frames 602 input into the 3D model generation system 600.

The triplane feature engine 612 is configured to project features from the filtered canonical pose frame into various 3D planes to extract features from a 2D image. For example, the triplane feature engine 612 is configured to project features from the filtered canonical pose into a XY plane, an XZ plane, and a YZ plane. The triplane feature engine 612 extracts features from each plane and maps each feature into a common coordinate system with the general feature engine 610. The triplane approach further reduces memory consumption by extracting 3D features using 2D techniques.

The triplane feature engine 612 generates unique features that are mapped to the same coordinate system as the general feature point cloud output from the general feature engine 610. Accordingly, a concatenator 614 can merge the unique features from the triplane feature engine 612 with the general features of the general feature point cloud.

In some aspects, the combined features from the concatenator 614 are provided to an MLP 618. The MLP 618 also receives pose information 620. The pose information 620 comprises an arbitrary pose that is provided by an external system. For example, the pose information can be provided by one or more virtual reality controllers for mapping a pose of a person (or other subject) to an avatar in a digital environment. For example, the MLP 618 is configured to mutate the general feature point cloud and the unique features based on the pose information to generate an avatar corresponding to the person in the frames 602 with an arbitrary pose associated with the MLP 618 also receives pose information 620. The final color and density at point p as seen from viewing direction d is predicted as c(p),σ(p)= $MLP_{NERF}$ ($e^i(p_e)$, $e^g(p_e)$, $\gamma(p)$, $\gamma(d)$), with c(p) corresponding to a color of an arbitrary point p and σ(p) corresponding to a density of the arbitrary point based on viewing direction d, $\gamma(p)$, $\gamma(d)$.

In some aspects, regular feature grids (voxels, planes) are wasteful in terms of memory to model sparse 3D structures. An irregular feature grid of corresponding SMPL vertices in a canonical pose reduces memory consumption and reduces calculations that have no impact on the resulting models.

Figure 7:
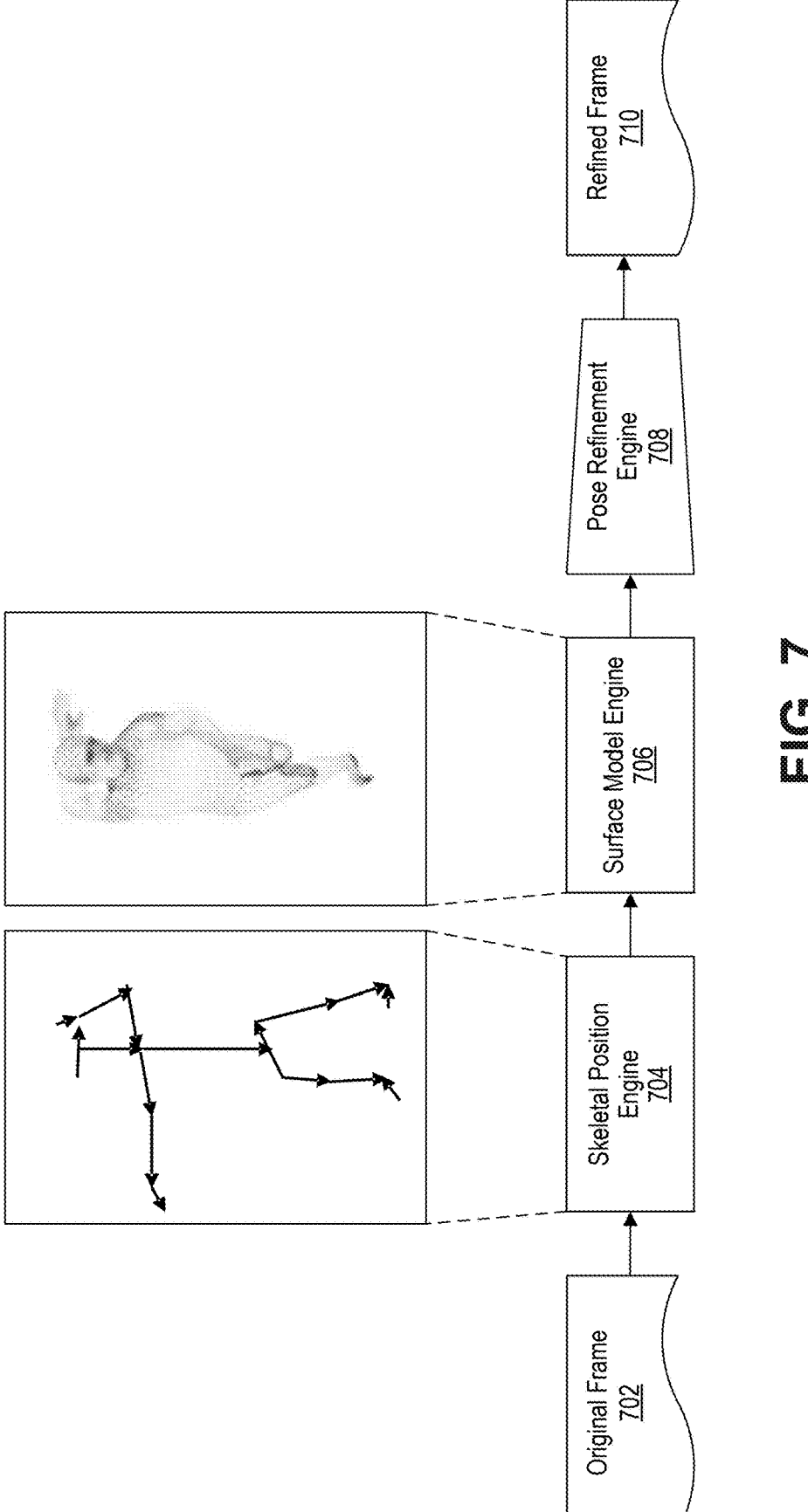
FIG. 7 is a conceptual diagram of a pose refinement engine in accordance with some aspects of the disclosure.

FIG. 7 is a conceptual diagram of a pose refinement engine 700 in accordance with some aspects of the disclosure. The pose refinement engine 700 accepts a frame 702 and provides the frame 702 to a skeletal position engine 704 for generating a skeletal model. For example, the skeletal models may correspond to the 24 skeletal bones associated with a human model that is represented by a pose vector $S \in R^{72 \times 1}$.

The pose vector S is provided to a surface model engine 706 that is configured to generate a volume of points. For example, the surface model engine 706 may be an ML model that is configured to estimate a surface model of a human body based on the pose vector S and an image (e.g., frame 702). The surface model corresponding to the frame 702 may also be input into a pose refinement engine 708 for correcting any positioning errors. For example, the pose refinement engine 708 may be a rule-based or an ML-based engine (or a combination of rule and ML) that is configured to identify incorrect human positioning and/or correct positioning based on the estimates. For example, a human hand cannot be parallel to the ground when positioned behind the back and above the waist, and a spherical boundary condition for the elbow exists when rotated in front of the body.

The pose refinement engine 708 produces a refined frame 710 that can be used in other ML-based tasks. For example, the pose refinement engine 708 may be provided to a pose transformation engine (e.g., the pose transformation engine 606) for conversion into the canonical pose, as described above.

FIG. 8 is a flowchart illustrating an example method 800 for generating a mutable 3D model using a monocular video in accordance illustrating with aspects of the present disclosure. The method 800 can be performed by a computing device (or system) having an image sensor, such as a mobile wireless communication device, a vehicle (e.g., an autonomous or semi-autonomous vehicle, a wireless-enabled vehicle, and/or other type of vehicle) or computing device or system of the vehicle, a robot device or system (e.g., for residential or manufacturing purposes), a camera, an XR device, or another computing device. In one illustrative example, a computing system (e.g., computing system 1100) can be configured to perform all or part of the method 800.

At block 802, the computing device (e.g., the computing system 1100) may estimate a plurality of features associated with images of a person. For example, the computing system may include an image sensor to obtain a plurality of images of the person. In another example, the computer system can provide the plurality of images. In some cases, to estimate the plurality of features at block 802, the computing device can estimate a position of a plurality of bones in an image using a first model and can estimate positions of the plurality of features based on the position of the plurality of bones using a second model. In one aspect, the first model is an ML model for identifying bone positions of the person in the image, and the second model in an ML model for identifying a surface of the person from the image. For example, the plurality of features may correspond to a surface of the person in the image.

At block 804, the computing device may inverse warp the plurality of features into reference pose features having a reference pose. A non-limiting example of the reference pose features comprises a T-pose.

At block 806, the computing device may generate filtered reference pose features by selecting features from the reference pose features based on a distance of the selected features from corresponding features from the reference pose. In one aspect, to generate the filtered reference pose at block 806, the computing system may select one or more features from the filtered reference pose features corresponding to a first reference feature of the reference model. For example, the selected features may be within 10 cm of a surface of the reference pose. The computing system may also interpolate the one or more features to represent the first reference feature in the modified reference pose features. In one non-limiting example, the computing system may use a KNN to identify neighboring points and interpolate the points to represent the first feature.

At block 808, the computing device may generate modified reference pose features by modifying the filtered reference pose features based on a feature grid associated with a reference model associated with the reference pose. In some aspects, the feature grid associated with the reference model comprises features anchored on a skinned multi-person linear model in the reference pose. The reference model may also include a machine learning model that is trained from a dataset including images of people having different physical characteristics. For example, the machine learning model may include a multilayer perceptron (MLP), fully connected layer, or other layer or component configured to generate the 3D model based on the first features, the modified reference pose features, and the pose information. Pose information corresponds to an arbitrary pose that the multilayer perceptron will render a digital representation of the person in.

In some aspects, at block 808, the computing system may add. a positional encoding to each of the modified reference pose features. In some cases, interpolating features for an arbitrary point for an irregular feature grid may not provide sufficiently accurate features. The positional encoding may improve the interpolation of features while providing a negligible increase in complexity.

At block 810, the computing device may project the filtered reference pose features into one or more 2D planes. For example, the filtered reference pose features can be projected into at least one of an XY plane, an XZ plane, and a YZ plane.

At block 812, the computing device may identify first features associated with the person from the one or more 2D planes. In some aspects, the computing device may fine tuning parameters of a machine learning model based on the first features extracted from one or more of the images. In one aspect, the computing device may query each plane of the one or more 2D planes for information related to a feature in the filtered reference pose features to identify the first features. The query is performed using a bi-linear interpolation on each plane (e.g., the XY plane, the XZ plane, and the YZ plane), which are more efficient than an interpolation within 3D geometry.

At block 814, the computing device may generate a 3D model of the person having a pose using the first features, the modified reference pose features, and pose information corresponding to the pose. In one aspect, the computing device may combine the filtered reference pose features and the first features into combined features (e.g., by concatenating the filtered reference pose features and the first features, etc.), and provide the combined features to a machine learning model to generate the 3D model of the person. For example, as noted above, the machine learning model may be or may include an MLP, a fully connected layer, or other neural network layer or component.

In some aspects, the computing device may warp, using the machine learning model (e.g., the MLP, the fully connected layer, etc.), points in the modified reference pose features and the first features based on the pose information. For example, the pose information can be input from an external source (e.g., a virtual reality controller, data from an application related to presentation of the person, etc.) to place a digital representation of the person in an arbitrary pose.

In some examples, the methods described herein (e.g., method 800, and/or other methods described herein) may be performed by a computing device or apparatus. In one example, the method 800 can be performed by a computing device having a computing architecture of the computing system 1100 shown in FIG. 11.

The method 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The method 800, and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 9:
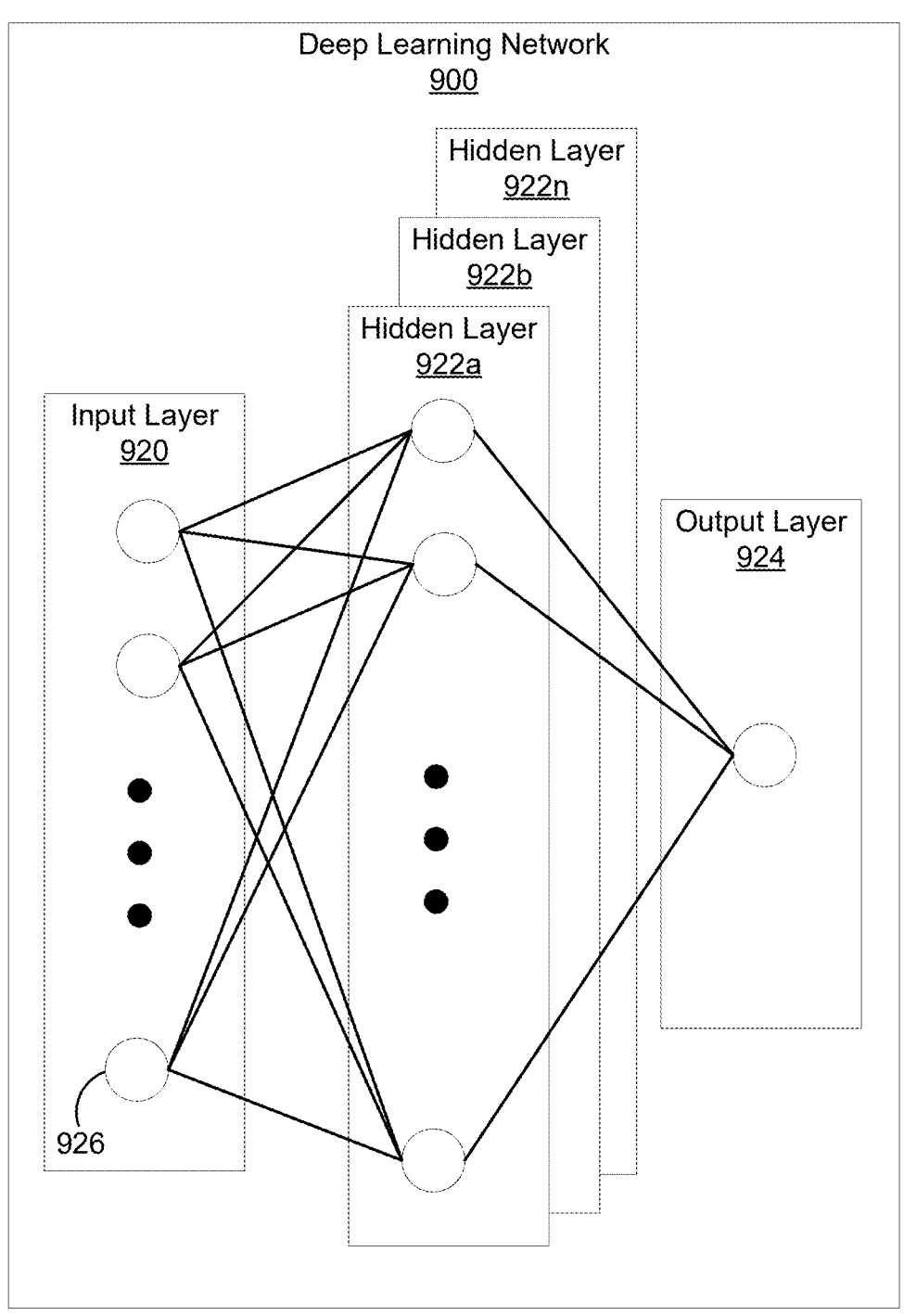
FIG. 9 is an illustrative example of a deep learning neural network that can be used to implement the machine learning-based alignment prediction, in accordance with aspects of the present disclosure.

As noted above, various aspects of the present disclosure can use machine learning models or systems. FIG. 9 is an illustrative example of a deep learning neural network 900 that can be used to implement the machine learning based alignment prediction described above. An input layer 920 includes input data. In one illustrative example, the input layer 920 can include data representing the pixels of an input video frame. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922a, 922b, through 922n. In one illustrative example, the output layer 924 can provide a classification for an object in an input video frame. The classification can include a class identifying the type of activity (e.g., looking up, looking down, closing eyes, yawning, etc.).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the first hidden layer 922a can transform the information of each input node by applying activation functions to the input node information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify features and/or objects in images, the neural network 900 can be trained using training data that includes both images and labels, as described above. For instance, training images can be input into the network, with each training frame having a label indicating the features in the images (for a feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 900 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying features and/or objects in images, the forward pass can include passing a training image through the neural network 900. The weights are initially randomized before the neural network 900 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
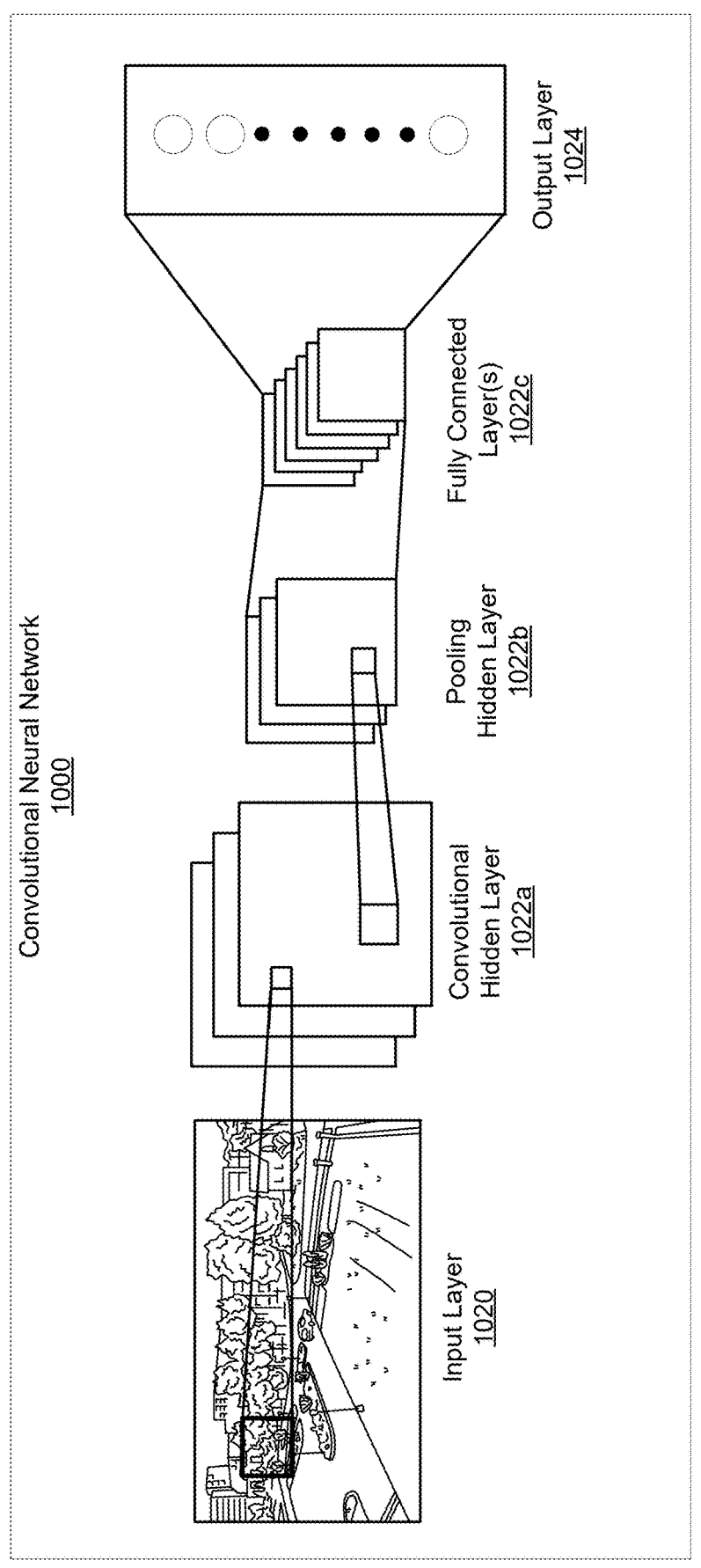
FIG. 10 is an illustrative example of a convolutional neural network (CNN), in accordance with aspects of the present disclosure.

FIG. 10 is an illustrative example of a CNN 1000. The input layer 1020 of the CNN 1000 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022a, an optional non-linear activation layer, a pooling hidden layer 1022b, and fully connected hidden layers 1022c to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022a. The convolutional hidden layer 1022a analyzes the image data of the input layer 1020. Each node of the convolutional hidden layer 1022a is connected to a region of nodes (pixels) of the input image called a receptive field. The convolutional hidden layer 1022a can be considered as one or more filters (each filter corresponding to a different activation or feature map), with each convolutional iteration of a filter being a node or neuron of the convolutional hidden layer 1022a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022a. Each connection between a node and a receptive field for that node learns a weight and, in some cases, an overall bias such that each node learns to analyze its particular local receptive field in the input image. Each node of the hidden layer 1022a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022a is due to each node of the convolutional layer being applied to its corresponding receptive field. For example, a filter of the convolutional hidden layer 1022a can begin in the top-left corner of the input image array and can convolve around the input image. As noted above, each convolutional iteration of the filter can be considered a node or neuron of the convolutional hidden layer 1022a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022a.

The mapping from the input layer to the convolutional hidden layer 1022a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1022a can include several activation maps in order to identify multiple features in an image. The example shown in FIG. 10 includes three activation maps. Using three activation maps, the convolutional hidden layer 1022a can detect three different kinds of features, with each feature being detectable across the entire image.

In some examples, a non-linear hidden layer can be applied after the convolutional hidden layer 1022a. The non-linear layer can be used to introduce non-linearity to a system that has been computing linear operations. One illustrative example of a non-linear layer is a rectified linear unit (ReLU) layer. A ReLU layer can apply the function $f(x)=max(0, x)$ to all of the values in the input volume, which changes all the negative activations to 0. The ReLU can thus increase the non-linear properties of the CNN 1000 without affecting the receptive fields of the convolutional hidden layer 1022a.

The pooling hidden layer 1022b can be applied after the convolutional hidden layer 1022a (and after the non-linear hidden layer when used). The pooling hidden layer 1022b is used to simplify the information in the output from the convolutional hidden layer 1022a. For example, the pooling hidden layer 1022b can take each activation map output from the convolutional hidden layer 1022a and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling hidden layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922b is connected to every node of the output layer 924.

The fully connected layer 922n can obtain the output of the previous pooling hidden layer (e.g., the pooling hidden layer 922b), which should represent the activation maps of high-level features, and can determine the features that most correlate to a particular class. For example, the fully connected layer 922n layer can determine the high-level features that most strongly correlate to a particular class, and can include weights (nodes) for the high-level features. A product can be computed between the weights of the fully connected layer 922n and the previous pooling hidden layer (e.g., pooling hidden layer 922b) to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 924 can include an M-dimensional vector (in the prior example, M=10). M indicates the number of classes that the CNN 1000 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 11:
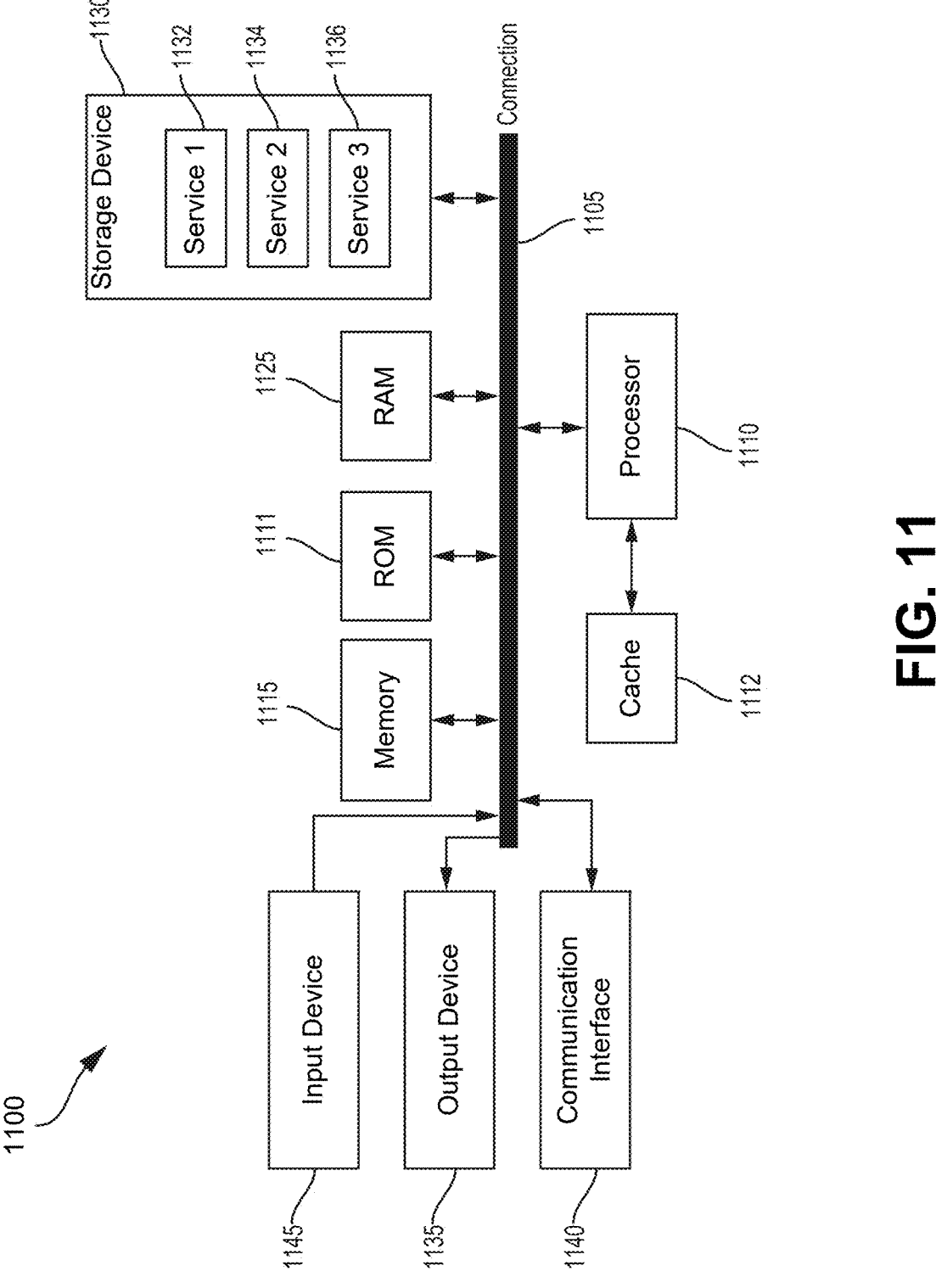
FIG. 11 is a diagram illustrating an example of a system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1100 includes at least one processing unit (CPU or processor) 1110 and connection 1105 that couples various system components including system memory 1115, such as ROM 1111 and RAM 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wiredport/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the methods described herein (e.g., method 800, and/or other process described herein) may be performed by a computing device or apparatus. In one example, the method 800 can be performed by a computing device having a computing architecture of the computing system 1100 shown in FIG. 11.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as RAM such as synchronous dynamic random access memory (SDRAM), ROM, nonvolatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the present disclosure include:

Aspect 1. A method for generating a mutable 3D model, comprising: estimating a plurality of features associated with images of a person; inverse warping the plurality of features into reference pose features having a reference pose; generating filtered reference pose features by selecting features from the reference pose features based on a distance of the selected features from corresponding features from the reference pose; generating modified reference pose features by modifying the filtered reference pose features based on a feature grid associated with a reference model associated with the reference pose; projecting the filtered reference pose features into one or more 2D planes; identifying first features associated with the person from the one or more 2D planes; and generating a 3D model of the person having a pose using the first features, the modified reference pose features, and pose information corresponding to the pose.

Aspect 2. The method of Aspect 1, wherein modifying the filtered reference pose features based on the feature grid comprises: selecting one or more features from the filtered reference pose features corresponding to a first reference feature of the reference model; and interpolating the one or more features to represent the first reference feature in the modified reference pose features.

Aspect 3. The method of any of Aspects 1 to 2, wherein estimating the plurality of features comprises: estimating a position of a plurality of bones in an image using a first model; and estimating positions of the plurality of features based on the position of the plurality of bones using a second model, wherein the plurality of features corresponds to a surface of the person in the image.

Aspect 4. The method of any of Aspects 1 to 3, wherein the reference pose features comprise a T-pose.

Aspect 5. The method of any of Aspects 1 to 4, wherein the feature grid associated with the reference model comprises features anchored on a skinned multi-person linear model in the reference pose.

Aspect 6. The method of any of Aspects 1 to 5, further comprising: adding a positional encoding to each of the modified reference pose features.

Aspect 7. The method of any of Aspects 1 to 6, wherein identifying the first features comprises: fine tuning parameters of a machine learning model based on the first features extracted from one or more of the images.

Aspect 8. The method of any of Aspects 1 to 7, wherein the reference model includes a machine learning model trained from a dataset including images of people having different physical characteristics.

Aspect 9. The method of any of Aspects 1 to 8, wherein the machine learning model includes a multilayer perceptron configured to generate the 3D model based on the first features, the modified reference pose features, and the pose information.

Aspect 10. The method of any of Aspects 8 or 9, further comprising: warping, using the machine learning model (e.g., the multilayer perceptron), points in the modified reference pose features and the first features based on the pose information.

Aspect 11. The method of any of Aspects 1 to 10, wherein identifying the first features associated with the person from the one or more 2D planes comprises querying each plane of the one or more 2D planes for information related to a feature in the filtered reference pose features.

Aspect 12. The method of any of Aspects 1 to 11, wherein generating the 3D model of the person having the pose using the first features comprises: combining the filtered reference pose features and the first features into combined features; and providing the combined features to a machine learning model.

Aspect 13. An apparatus for generating a mutable 3D model comprising at least one memory and at least one processor coupled to the at least one memory and configured to: estimate a plurality of features associated with images of a person; inverse warp the plurality of features into reference pose features having a reference pose; generate filtered reference pose features by selecting features from the reference pose features based on a distance of the selected features from corresponding features from the reference pose; generate modified reference pose features by modifying the filtered reference pose features based on a feature grid associated with a reference model associated with the reference pose; project the filtered reference pose features into one or more 2D planes; identify first features associated with the person from the one or more 2D planes; and generate a 3D model of the person having a pose using the first features, the modified reference pose features, and pose information corresponding to the pose.

Aspect 14. The apparatus of Aspect 13, wherein the at least one processor is configured to: select one or more features from the filtered reference pose features corresponding to a first reference feature of the reference model; and interpolate the one or more features to represent the first reference feature in the modified reference pose features.

Aspect 15. The apparatus of any of Aspects 13 to 14, wherein the at least one processor is configured to: estimate a position of a plurality of bones in an image using a first model; and estimate positions of the plurality of features based on the position of the plurality of bones using a second model, wherein the plurality of features corresponds to a surface of the person in the image.

Aspect 16. The apparatus of any of Aspects 13 to 15, wherein the reference pose features comprise a T-pose.

Aspect 17. The apparatus of any of Aspects 13 to 16, wherein the feature grid associated with the reference model comprises features anchored on a skinned multi-person linear model in the reference pose.

Aspect 18. The apparatus of any of Aspects 13 to 17, wherein the at least one processor is configured to: add a positional encoding to each of the modified reference pose features.

Aspect 19. The apparatus of any of Aspects 13 to 18, wherein the at least one processor is configured to: fine tune parameters of a machine learning model based on the first features extracted from one or more of the images.

Aspect 20. The apparatus of any of Aspects 13 to 19, wherein the reference model includes a machine learning model trained from a dataset including images of people having different physical characteristics.

Aspect 21. The apparatus of any of Aspects 13 to 20, wherein the machine learning model includes a multilayer perceptron configured to generate the 3D model based on the first features, the modified reference pose features, and the pose information.

Aspect 22. The apparatus of any of Aspects 20 or 21, wherein the at least one processor is configured to: warp, using the machine learning model (e.g., the multilayer perceptron), points in the modified reference pose features and the first features based on the pose information.

Aspect 23. The apparatus of any of Aspects 13 to 22, wherein the at least one processor is configured to query each plane of the one or more 2D planes for information related to a feature in the filtered reference pose features to identify the first features.

Aspect 24. The apparatus of any of Aspects 13 to 24, wherein the at least one processor is configured to: combine the filtered reference pose features and the first features into combined features; and provide the combined features to a machine learning model to generate the 3D model of the person Aspect 25. A non-transitory computer-readable medium having stored thereon instructions that, when executed by at least one processor, cause the at least one processor to perform operations according to any of Aspects 1 to 12.

Aspect 26. An apparatus for processing one or more images, comprising one or more means for performing operations according to any of Aspects 1 to 12.

What is claimed is:

1. An apparatus for generating a mutable three-dimensional (3D) model, the apparatus comprising:
   at least one memory; and
   at least one processor coupled to the at least one memory and configured to:
      estimate a plurality of features associated with images of a person;
      inverse warp the plurality of features into reference pose features having a reference pose;
      generate filtered reference pose features by selecting features from the reference pose features based on a distance of the selected features from corresponding features from the reference pose;
      generate modified reference pose features by modifying the filtered reference pose features based on corresponding features of a reference model associated with the reference pose, wherein the reference model is mapped to a feature grid;
      project the filtered reference pose features into one or more two dimensional (2D) planes;
      identify first features associated with the person from the one or more 2D planes; and
      generate a 3D model of the person having a pose using the first features from the one or more 2D planes, the modified reference pose features, and pose information corresponding to the pose.

2. The apparatus of claim 1, wherein the at least one processor is configured to:
   select one or more features from the filtered reference pose features corresponding to a first reference feature of the reference model; and
   interpolate the one or more features to represent the first reference feature in the modified reference pose features.

3. The apparatus of claim 1, wherein the at least one processor is configured to:
   estimate a position of a plurality of bones in an image using a first model; and
   estimate positions of the plurality of features based on the position of the plurality of bones using a second model, wherein the plurality of features corresponds to a surface of the person in the image.

4. The apparatus of claim 1, wherein the reference pose features comprise a T-pose.

5. The apparatus of claim 1, wherein the feature grid associated with the reference model comprises features anchored on a skinned multi-person linear model in the reference pose.

6. The apparatus of claim 1, wherein the at least one processor is configured to:
   add a positional encoding to each of the modified reference pose features.

7. The apparatus of claim 1, wherein the at least one processor is configured to:
   fine tune parameters of a machine learning model based on the first features extracted from one or more of the images.

8. The apparatus of claim 1, wherein the reference model includes a machine learning model trained from a dataset including images of people having different physical characteristics.

9. The apparatus of claim 8, wherein the machine learning model includes a multilayer perceptron configured to generate the 3D model based on the first features, the modified reference pose features, and the pose information.

10. The apparatus of claim 8, wherein the at least one processor is configured to:
   warp, use the machine learning model, points in the modified reference pose features and the first features based on the pose information.

11. The apparatus of claim 1, wherein the at least one processor is configured to:
   query each plane of the one or more 2D planes for information related to a feature in the filtered reference pose features to identify the first features.

12. The apparatus of claim 1, wherein the at least one processor is configured to:
   combine the filtered reference pose features and the first features into combined features; and
   provide the combined features to a machine learning model to generate the 3D model of the person.

13. A method for generating a mutable three-dimensional (3D) model, comprising:
   estimating a plurality of features associated with images of a person;
   inverse warping the plurality of features into reference pose features having a reference pose;
   generating filtered reference pose features by selecting features from the reference pose features based on a distance of the selected features from corresponding features from the reference pose;
   generating modified reference pose features by modifying the filtered reference pose features based on corresponding features of a reference model associated with the reference pose, wherein the reference model is mapped to a feature grid;
   projecting the filtered reference pose features into one or more two dimensional (2D) planes;
   identifying first features associated with the person from the one or more 2D planes; and generating a 3D model of the person having a pose using the first features from the one or more 2D planes, the modified reference pose features, and pose information corresponding to the pose.

14. The method of claim 13, wherein modifying the filtered reference pose features based on the feature grid comprises:

selecting one or more features from the filtered reference pose features corresponding to a first reference feature of the reference model; and interpolating the one or more features to represent the first reference feature in the modified reference pose features.

15. The method of claim 13, wherein estimating the plurality of features comprises:

estimating a position of a plurality of bones in an image using a first model; and estimating positions of the plurality of features based on the position of the plurality of bones using a second model, wherein the plurality of features corresponds to a surface of the person in the image.

16. The method of claim 13, wherein the feature grid associated with the reference model comprises features anchored on a skinned multi-person linear model in the reference pose.

17. The method of claim 13, further comprising:

adding a positional encoding to each of the modified reference pose features.

18. The method of claim 13, wherein identifying the first features comprises:

fine tuning parameters of a machine learning model based on the first features extracted from one or more of the images.

19. The method of claim 13, wherein the reference model includes a machine learning model trained from a dataset including images of people having different physical characteristics.

20. The method of claim 19, further comprising:

warping, using the machine learning model, points in the modified reference pose features and the first features based on the pose information.

* * * * *